(No Model.) 2 Sheets—Sheet 1.
T. HOLT & H. HOWSON.
REFRIGERATOR.
No. 495,737. Patented Apr. 18, 1893.
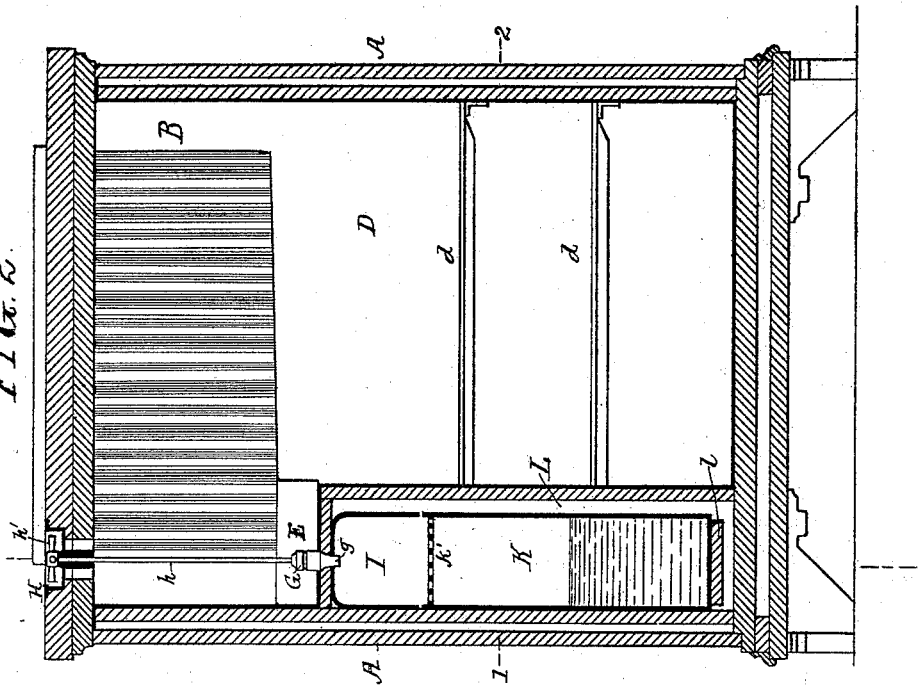
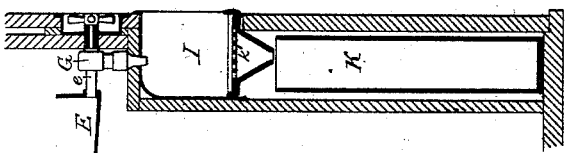
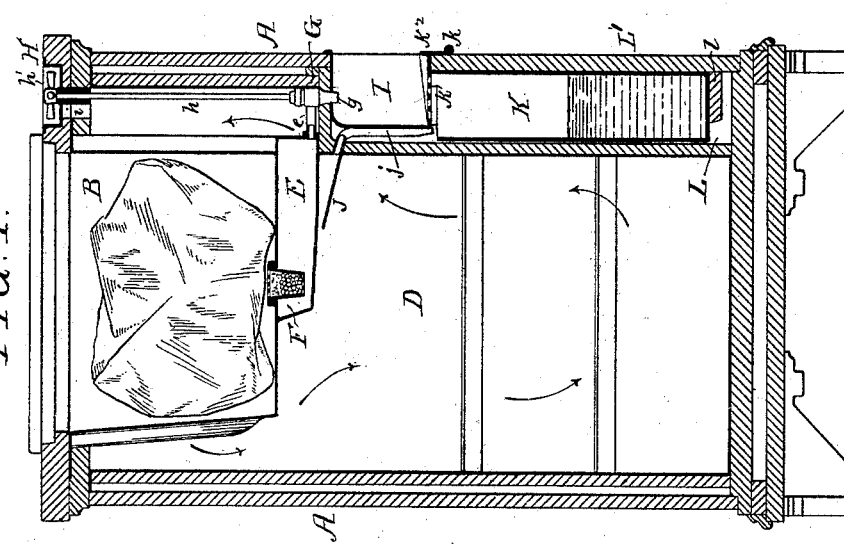
Witnesses:
William D. Conner
Alex. Barkoff
Inventors
Thomas Holt &
Henry Howson
by their Attorneys
Howson & Howson

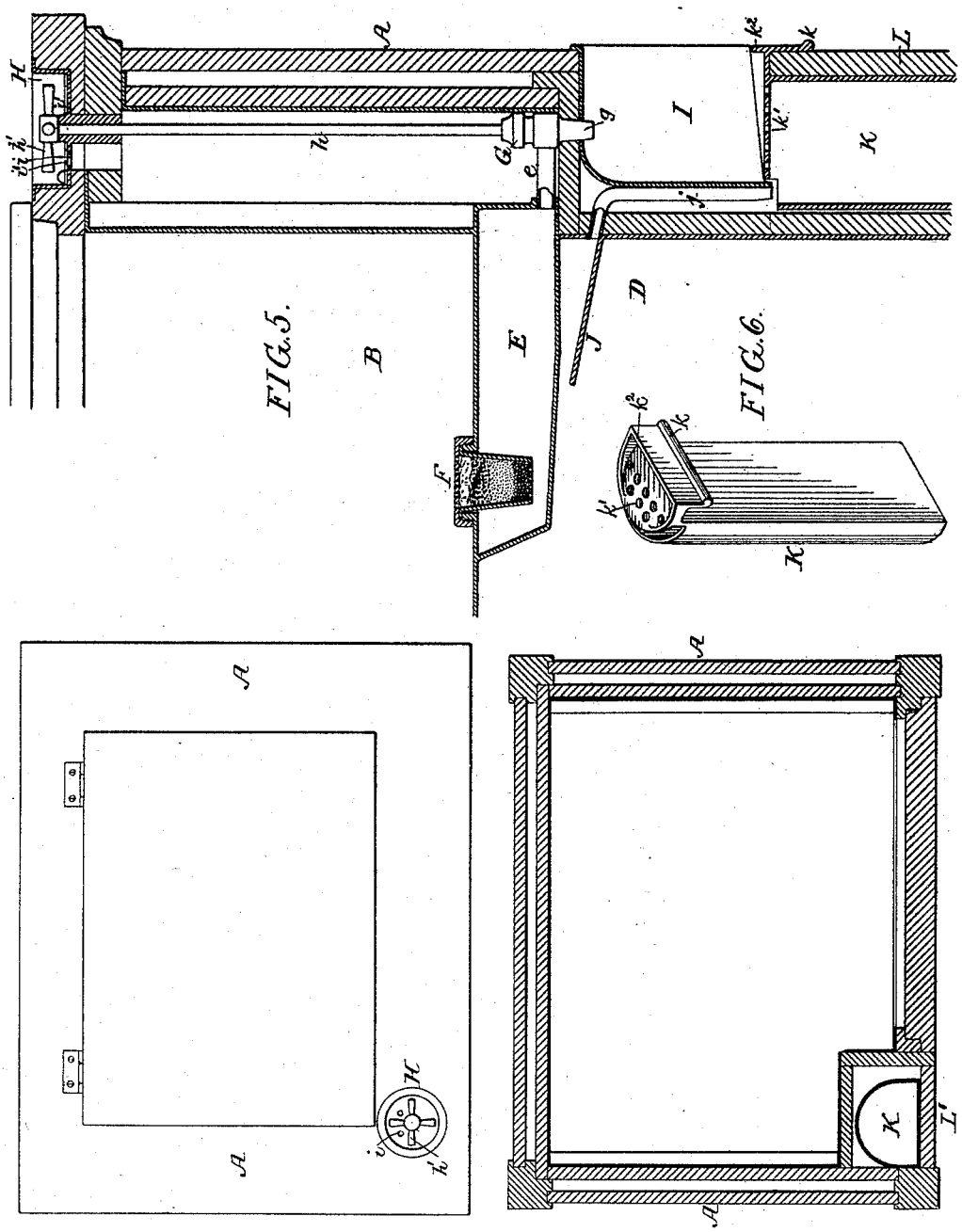

UNITED STATES PATENT OFFICE.

THOMAS HOLT AND HENRY HOWSON, OF PHILADELPHIA, PENNSYLVANIA, ASSIGNORS TO SAID HOLT.

REFRIGERATOR.

SPECIFICATION forming part of Letters Patent No. 495,737, dated April 18, 1893.

Application filed July 6, 1888. Serial No. 279,174. (No model.)

*To all whom it may concern:*

Be it known that we, THOMAS HOLT and HENRY HOWSON, both citizens of the United States, and residents of Philadelphia, Pennsylvania, have invented certain Improvements in Refrigerators, of which the following is a specification.

One object of our invention is to prevent the accidental turning of the spigot, a further object being to so construct the refrigerator that the drip tray can be removed to permit the placing of a large vessel under the spigot, and still further objects being to dispense with the usual drip pan under the refrigerator, and to provide a ventilator for the provision chamber.

In the accompanying drawings—Figure 1 is a transverse section of our improved refrigerator. Fig. 2 is a longitudinal section of the same. Fig. 3 is a plan view. Fig. 4 is a sectional plan on the line 1—2, Fig. 2. Fig. 5 is an enlarged sectional view of a portion of the refrigerator. Fig. 6 is an enlarged perspective view of the drip pan and tray; and Fig. 7 is a view showing a different form of drip tank.

A is the casing of the refrigerator, made in any suitable manner, and B is the ice-box, preferably made of corrugated metal, as shown, in order to increase the cooling surface, D being the provision chamber, having suitable trays $d, d$. Directly under one end of the ice chamber is a cold water chamber E, and between the ice chamber and the cold water chamber is a filter F, shown more clearly in Fig. 5. This filter has a perforated cap and a perforated bottom and is filled with suitable filtering material.

The top of the filter is elevated above the bottom of the ice chamber, in order to prevent the access of sediment to the filter.

The chamber E has an outlet pipe $e$, and this pipe is provided with a valve or spigot G, having a nozzle $g$ and valve stem $h$, the latter having a handle $h'$ at its upper end, which is situated in a sunken shell H in the top of the refrigerator, so that it will be impossible to turn the handle accidentally, the handle being also out of the reach of children.

I is the recess or niche for the tumbler, the nozzle $g$ of the faucet extending into the niche from the top, as shown in Figs. 1, 2 and 5. The niche is just large enough to receive a tumbler, such contracted area of the niche being permissible, as the spigot is not situated in the niche, but above it. The niche may be lined with any suitable sheet metal, as circumstances suggest. In the rear of the sheet metal lining, as shown in Figs. 1 and 5, is a drip pipe $j$, receiving the drip from the drip plate J, which extends under the ice box so as to catch the sweat drip, which will pass out through the drip pipe $j$.

The offset in the casing of the refrigerator necessitated by the tumbler niche I extends below said niche, and receives a drip tank K, which is carried by a door L', as shown in Figs. 4 and 5, the drip tank having a lip $k$, which overhangs said door, and the tank also resting upon a bracket $l$ on the lower portion of the door, so that the drip tank is wholly supported by the door and swings with the same.

The top of the drip tank forms the perforated tray $k'$ on which the tumbler rests, a rim $k^2$ extending part way around said tray, as shown in the perspective view, Fig. 6.

We cut away a portion of the tank, as shown in Figs. 5 and 6, to allow the drip water that flows through the pipe $j$ to pass into the tank, and at the same time, to provide an enlarged opening from which the water can be discharged in emptying the tank.

By extending the recess L for some distance beneath the niche I, we are enabled, on opening the door L', to insert a pitcher or other receptacle into the recess, in order that the pitcher may be filled from the spigot, a result which otherwise could not be accomplished.

We ventilate the refrigerator by perforating the sunken shell H at $i$, and preferably provide a damper or valve $i'$, by which the perforations can be closed when found necessary.

The detachable tumbler tray may be independent of the door L if desired.

In some instances, the spigot handle may be located at the front of the refrigerator, and the drip tank can be made separate from the tumbler tray, which can be secured to the door L' as shown in Fig. 7.

We claim as our invention—

1. The combination in a refrigerator of the tumbler niche, a faucet therein, an extended recess directly beneath said niche forming a continuation of the same, with a door closing only the recess, leaving the niche exposed, a tumbler tray carried by the door and separating the niche from the recess, and a removable drip tank in said recess, substantially as specified.

2. The combination, in a refrigerator, of the ice-box, the faucet, the tumbler niche, a drip tank situated in line with and below said niche, a sweat drip catcher J below the ice-box, a drip pipe j extending from the drip catcher to the drip tank, substantially as set forth.

3. The combination, in a refrigerator, of a tumbler niche, a recess below said niche, and a door closing only the niche, with a drip tank K having a lip k extending over the top of the door, and by which the tank is supported substantially as described.

4. The combination, in a refrigerator, of the ice-box, the tumbler niche, having a lining, a sweat drip catcher J, and a pipe back of the niche lining from said drip-catcher to the waste, substantially as set forth.

5. The combination, in a refrigerator, of the faucet and its handle, extending to the top of the refrigerator, with a sunken shell for said handle, said shell being perforated and communicating with and venting the provision chamber of the refrigerator, substantially as described.

In testimony whereof we have signed our names to this specification in the presence of two subscribing witnesses.

THOMAS HOLT.
HENRY HOWSON.

Witnesses:
EDWARD M. RILEY,
HARRY SMITH.